Feb. 1, 1949.　　　　R. I. MARKEY　　　2,460,646
CHANNEL TYPE CLAMP FOR SLIP JOINTS
Filed March 30, 1945

INVENTOR
Roscoe I. Markey
BY
ATTORNEY

Patented Feb. 1, 1949

2,460,646

UNITED STATES PATENT OFFICE 2,460,646

CHANNEL TYPE CLAMP FOR SLIP JOINTS

Roscoe I. Markey, Montclair, N. J., assignor, by mesne assignments, to Noma Electric Corporation, New York, N. Y., a corporation of Maryland Application March 30, 1945, Serial No. 585,720

3 Claims. (Cl. 285—129)

1

The invention relates to a channel type clamp and is particularly adapted for use in slip joints of exhaust manifold systems of aircraft engines.

It is well known that considerable expansion and contraction takes place in exhaust manifold systems of aircraft engines due to changes of temperature. As a result of this condition joints have to be interposed in the collector ring and its connections such as the tail pipe and branch pipes.

The principal object of the present invention is to provide an exceedingly simple form of joint which permits of diametrical and longitudinal expansion and contraction of the parts due to changes in temperature. The construction while simple is rugged and materially aids in reinforcing the ends of the tubular members which are to be connected together.

Other objects and advantages will become apparent as this specification proceeds. Referring to the drawings forming a part thereof and in which preferred embodiments of the invention are illustrated:

Figure 1:
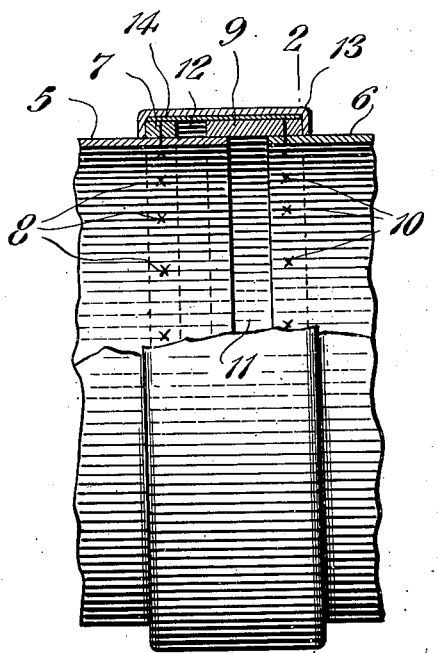
Fig. 1 is an elevational view, parts being broken away and in section.

In the drawing, the two tubular members to be locked together are designated by the reference numerals 5 and 6 and they might be any two parts of an exhaust manifold system for aircraft engines.

The tubular member 5 has a circumferential ring 7 resistance welded thereto at a distance somewhat remote from its end, the welding being indicated at 8. This ring is comparatively narrow in width.

The tubular member 6 has a comparatively wide ring 9 welded thereto, the welding being indicated at 10. It will be noted as particularly shown in Fig. 1 that a substantial part of the ring 9 overhangs this end of the tubular member 6 and the end of the tubular member 5 beyond the ring 7 enters into and engages the overhanging part of the ring 9.

We will assume with the parts in the position of Fig. 1, the engine is not running, the parts are cool and are in what might be termed the contracted position. When the longitudinal ex-

2 pansion occurs due to the intense heat set up in the manifold system by the running engine the ends of the tubular members 5 and 6 may move toward each other into the space 11 which is provided for that purpose and the rings 7 and 9 may move toward each other into the space 12 which is likewise provided for that purpose.

The rings 7 and 9 being of a rugged construction in comparison to the tubular members in addition to functioning as heretofore described act to reinforce the ends of the tubular members.

The split locking ring 13 is channel-shaped in cross section and is of the same depth as the thickness of the rings. It takes over the rings as shown in Fig. 1 and thus positively holds the ends of the tubular members 5 and 6 together and helps in forming a substantially gas tight connection. A split liner 14 may be interposed between the rings 7 and 9 and the split locking ring 13 if desired.

Figure 2:
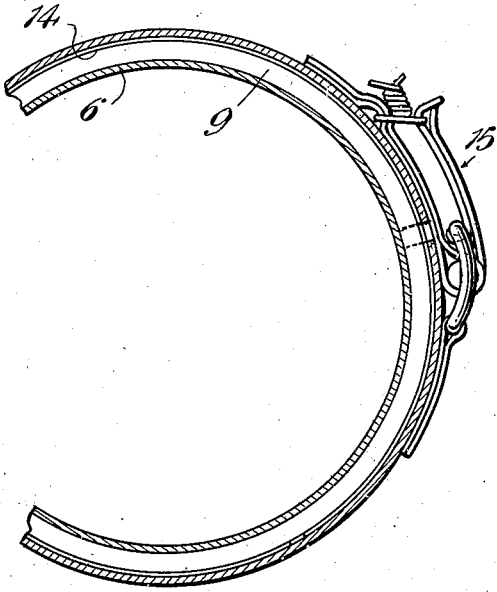
Fig. 2 is a cross sectional view taken on line 2—2 of Fig. 1.

The ends of the split clamping member 13 are secured together with a snap toggle locking means 15 which permits of diametrical expansion and contraction of the parts due to changes in temperature. As shown in Fig. 2 this locking means is of a type described and illustrated in my pending application Serial No. 546,531, filed July 25, 1944, now Patent No. 2,390,801. However any other known type of locking means could be utilized providing it allows for diametrical expansion and contraction.

Figure 3:
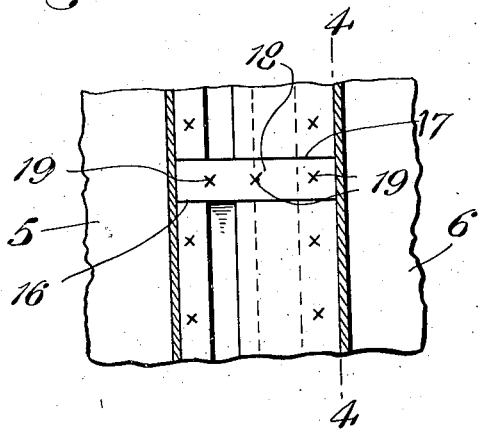
Fig. 3 is a fragmentary elevational view, the channel-shaped split clamping ring being in section, and shows a means for preventing rotation of the parts.
Figure 4:
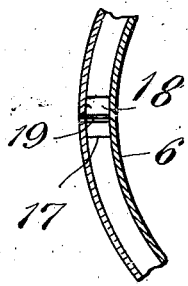
Fig. 4 is a fragmentary sectional view taken on line 4—4 of Fig. 3.

Figs. 3 and 4 illustrate a simple means of preventing rotation of the tubular members in relation to each other and for preventing rotation of the split locking ring in relation to the tubular members. This may or may not be used as desired and when it is used with the split liner 14 it is welded diametrically opposite the opening in the split liner to avoid restricting the flexibility of the clamp and liner.

A small segment is cut out of each of the rings as indicated at 16 and 17. A block 18 of the same width as the cut out portions of the rings is welded to the locking ring as indicated at 19. When this block is fitted into the cut out portions of the rings 7 and 9 due to its being welded to the split locking ring 13 it will obviously prevent the ring 13 from turning in relation to tubular members 5 and 6. Likewise the rings 7 and 9 being welded to the tubular members 5 and 6 the block 18 will prevent them turning in relation to each other.

The split liner 14 in the joint functions as a sealing ring to prevent the escape of gas. In a slip joint of the type heretofore described the clearance between the ring or band 9 and the extended projection of the tubular member 5 will be greater than in a locked or fixed joint and therefore more susceptible of leaking. The band on liner 14 provides a sealing surface on the outer periphery of the rings 7 and 9. The gap or split in the liner is spaced away from the gap in the split locking 13 and thus functions to prevent the escape of gas through the gap in the split locking ring.

Such changes in details of construction as would occur to one skilled in the art are to be considered as coming within the spirit of the invention as set forth in the appended claims.

I claim:

1. In an exhaust manifold system having a pair of tubular conduit members arranged end to end; the combination of an annular ring mounted on the outer periphery of one of said members adjacent one end thereof and spaced axially inwardly therefrom, a second annular ring mounted on the outer periphery of the other one of said members adjacent one end thereof and extending axially outwardly therefrom in overlapping engagement with the adjacent end of first named member, and means including a channel-shaped split clamping ring cooperating with said first and second named rings for holding said tubular conduit members against movement away from one another but permitting limited movement of said members axially with respect to one another to compensate for axial expansion and contraction due to temperature changes.

2. In an exhaust manifold system having a pair of tubular conduit members arranged end to end; the combination of a relatively narrow annular ring mounted on the outer periphery of one of said members adjacent one end thereof and spaced axially inwardly therefrom, a relatively wide annular ring mounted on the outer periphery of the other one of said members adjacent one end thereof and extending axially outwardly therefrom in overlapping engagement with the adjacent end of said first member, and means including a channel-shaped split clamping ring cooperating with said first and second named rings for holding said conduit members against movement away from one another but permitting limited movement of said members axially with respect to one another to compensate for axial expansion and contraction due to temperature changes.

3. In an exhaust manifold system having a pair of tubular conduit members arranged end to end; the combination of a relatively narrow annular ring mounted on the outer periphery of one of said members adjacent one end thereof and spaced axially inwardly therefrom, a relatively wide annular ring mounted on the outer periphery of the other one of said members adjacent one end thereof and extending axially outwardly therefrom in overlapping engagement with the adjacent end of said first member, means including a channel-shaped split clamping ring, cooperating with said first and second named rings for holding said conduit members against movement away from one another but permitting limited movement of said members axially with respect to one another to compensate for axial expansion and contraction due to temperature changes, and means cooperating with said clamping ring constructed and arranged to permit radial expansion and contraction of the parts due to temperature changes.

ROSCOE I. MARKEY.

REFERENCES CITED

The following references are of record in the file of this patent:

UNITED STATES PATENTS

| Number | Name | Date |
|---|---|---|
| 41,551 | Treadway et al. | Feb. 9, 1864 |
| 669,673 | Averbeck | Mar. 12, 1901 |
| 2,014,313 | Damsel | Sept. 10, 1935 |
| 2,027,824 | Hunt | Jan. 14, 1936 |